US012318803B2

(12) United States Patent
Furuya et al.

(10) Patent No.: US 12,318,803 B2
(45) Date of Patent: Jun. 3, 2025

(54) SUPPLY DEVICE AND SUPPLY SYSTEM

(71) Applicant: SHIBAURA MECHATRONICS CORPORATION, Yokohama (JP)

(72) Inventors: Masaaki Furuya, Yokohama (JP); Hiroaki Kobayashi, Yokohama (JP); Hideki Mori, Yokohama (JP)

(73) Assignee: SHIBAURA MECHATRONICS CORPORATION, Yokohama (JP)

( * ) Notice: Subject to any disclaimer, the term of this patent is extended or adjusted under 35 U.S.C. 154(b) by 226 days.

(21) Appl. No.: 17/942,786

(22) Filed: Sep. 12, 2022

(65) Prior Publication Data

US 2023/0081295 A1 Mar. 16, 2023

(30) Foreign Application Priority Data

Sep. 13, 2021 (JP) ................................ 2021-148850

(51) Int. Cl.
*B05C 11/10* (2006.01)
*B05C 11/11* (2006.01)

(52) U.S. Cl.
CPC ...... *B05C 11/1002* (2013.01); *B05C 11/1039* (2013.01); *B05C 11/1042* (2013.01); *B05C 11/11* (2013.01)

(58) Field of Classification Search
CPC ............. B05C 11/1002; B05C 11/1039; B05C 11/1042
See application file for complete search history.

(56) References Cited

U.S. PATENT DOCUMENTS 9,142,424 B2 * 9/2015 Uchida ..................... C25B 1/29
2019/0203342 A1 * 7/2019 Song ....................... C23C 14/24

FOREIGN PATENT DOCUMENTS

CN 110114858 A * 8/2019 ....... H01L 21/02052
CN 111905412 A 11/2020
JP 2007-258462 A 10/2007
JP 6869306 B2 * 5/2021
TW 201819685 A 6/2018

* cited by examiner

*Primary Examiner* — Angelisa L. Hicks
(74) *Attorney, Agent, or Firm* — Nath, Goldberg & Meyer; Jerald L. Meyer

(57) ABSTRACT

A supply device includes a collect tank which collects a process liquid from a substrate processing device and heats the collected liquid, and a supply tank connected to the collect tank and which supplies, to the substrate processing device, the process liquid heated in the collect tank. The collect tank includes a collect container that stores the process liquid, a first dividing plate that divides the collect container into a first region where the process liquid is introduced from the substrate processing device, and a second region that introduces the process liquid to the supply tank, piping that feeds, to the second region, the process liquid introduced in the first region, a first heater provided on a path through the piping and which heats the process liquid, and feed piping that feeds, to the supply tank, the process liquid in the second region and heated by the first heater.

11 Claims, 3 Drawing Sheets

SS

SUPPLY DEVICE AND SUPPLY SYSTEM

CROSS-REFERENCE TO RELATED APPLICATION

This application is based upon and claims the benefit of priority from Japan Patent Application No. 2021-148850, filed on Sep. 13, 2021, the entire contents of which are incorporated herein by reference.

FIELD OF THE INVENTION

The present disclosure relates to a supply device and a supply system.

BACKGROUND

Batch-type substrate processing devices that collectively impregnate a plurality of substrates with a process liquid, and single-wafer-type substrate processing devices that supply a process liquid to each of the substrates one by one are known as wet-etching devices that execute etching on a film laminated on a substrate, such as a semiconductor wafer or a glass, by a process liquid.

According to the batch-type substrate processing device, since a plurality of substrates is collectively processed, there is an advantage from the standpoint of productivity. In contrast, according to the single-wafer-type substrate processing device, since the substrate is processed one by one, there is a disadvantage in productivity in comparison with the batch-type substrate processing device, but extra-fine and uniform etching is enabled. In recent years, in particular, since microfabrication of a pattern on a substrate is advancing, a frequency at which single-wafer-type substrate processing device is applied is becoming high.

According to a single-wafer-type substrate processing device, in order to enable extra-fine and uniform etching, it is necessary to strictly control the temperature of a process liquid to be supplied to a substrate. Although the temperature of the process liquid is maintained at, for example, 160° C., when even 1° C. changes therefrom, an etching rate remarkably changes, resulting in non-uniformity in the etching depth. Accordingly, it is desirable that the change in the temperature of the process liquid should be suppressed within, for example, 0.2° C.

Meanwhile, since such a process liquid is relatively expensive, it is collected after etching, and is reutilized with the temperature being adjusted. For example, as disclosed in the following Patent Document 1, a process liquid utilized for etching is once collected in a tank, and after the liquid temperature is adjusted, such a process liquid is supplied again to a substrate.

SUMMARY OF THE INVENTION

A plurality of substrate processing devices is often connected to such a tank from the standpoint of efficiency. That is, the single tank collects the process liquid utilized in the plurality of substrate processing devices, and supplies the process liquid in the tank to the plurality of substrate processing devices. Hence, when the timings of substrate processing at the respective substrate processing devices overlap, the tank may collect a large amount of process liquid at once, and may supply a large amount of process liquid at once. Moreover, even if it is connected only to a single substrate processing device, the collection timing of the process liquid may vary when, for example, the substrate processing device is suspended.

In any cases, because of such technical problems, the change in the temperature of the process liquid in the tank becomes large, and the temperature control becomes difficult. When, for example, the plurality of substrate processing devices is connected and the amount of the process liquid to be collected increases due to the overlap of the substrate processing timings, since the temperature of the process liquid in the tank remarkably decreases, there is a possibility such that a sufficient heating time cannot be taken before the process liquid is supplied. Process liquid supply may be suspended until it is fully heated. In this case, however, since the temperature of the process liquid in the tank changes over time due to a change in the amount of the process liquid collected irregularly and at a variable amount, it is inevitable that an error in the temperature control becomes large. Moreover, when the temperature of the process liquid in the tank remarkably decreases, it is necessary to increase the heater output. However, it takes a time to decrease the heater output that has been once increased. Hence, in this case, the temperature control also becomes difficult due to an extra-heating of the process liquid in the tank. As described above, because of two factors that are the collection of the process liquid and the control on the heater, a sufficient temperature control cannot be executed on the process liquid, causing the non-uniformity in the etching depth to a substrate.

An objective of the present disclosure is to provide a supply device that stabilizes the liquid temperature of a process liquid to be supplied to a substrate processing device.

A supply device comprising:

a collect tank which collects a process liquid from a substrate processing device and which heats the collected liquid; and a supply tank which is connected to the collect tank and which supplies, to the substrate processing device, the process liquid heated in the collect tank, wherein:

the collect tank comprises:

a collect container that stores the process liquid;

a first dividing plate that divides the collect container into a first region where the process liquid is introduced from the substrate processing device, and a second region that introduces the process liquid to the supply tank;

piping that feeds, to the second region, the process liquid introduced in the first region;

a first heater which is provided on a path through the piping and which heats the process liquid; and feed piping that feeds, to the supply tank, the process liquid in the second region and heated by the first heater, the supply tank comprises:

a supply container that stores the process liquid fed out from the collect tank;

supply piping that supplies, to the substrate processing device, the process liquid stored in the supply container; and a second heater which is provided on a path through the supply piping and which heats the process liquid, the supply device further comprises a second dividing plate that divides the second region into a third region where the process liquid is fed from the piping, and a fourth region that supplies the process liquid to the substrate processing device, the first dividing plate is provided at one side-surface side of the collect container of the collect tank at which an end of the first dividing plate is connected, and is provided with an opening which causes the first region and the second region to be in communication with each other; and the second dividing plate is provided at an other side-surface side that is an opposite side to the one side surface of the collect container of the collect tank, and is provided with an opening which causes the third region and the fourth region to be in communication with each other.

Moreover, a supply system that includes the above-described supply device is also an embodiment of the present disclosure.

The supply device according to the present disclosure can stabilize the liquid temperature of a process liquid to be supplied to a substrate processing device.

DETAILED DESCRIPTION OF THE EMBODIMENTS

Figure 1:
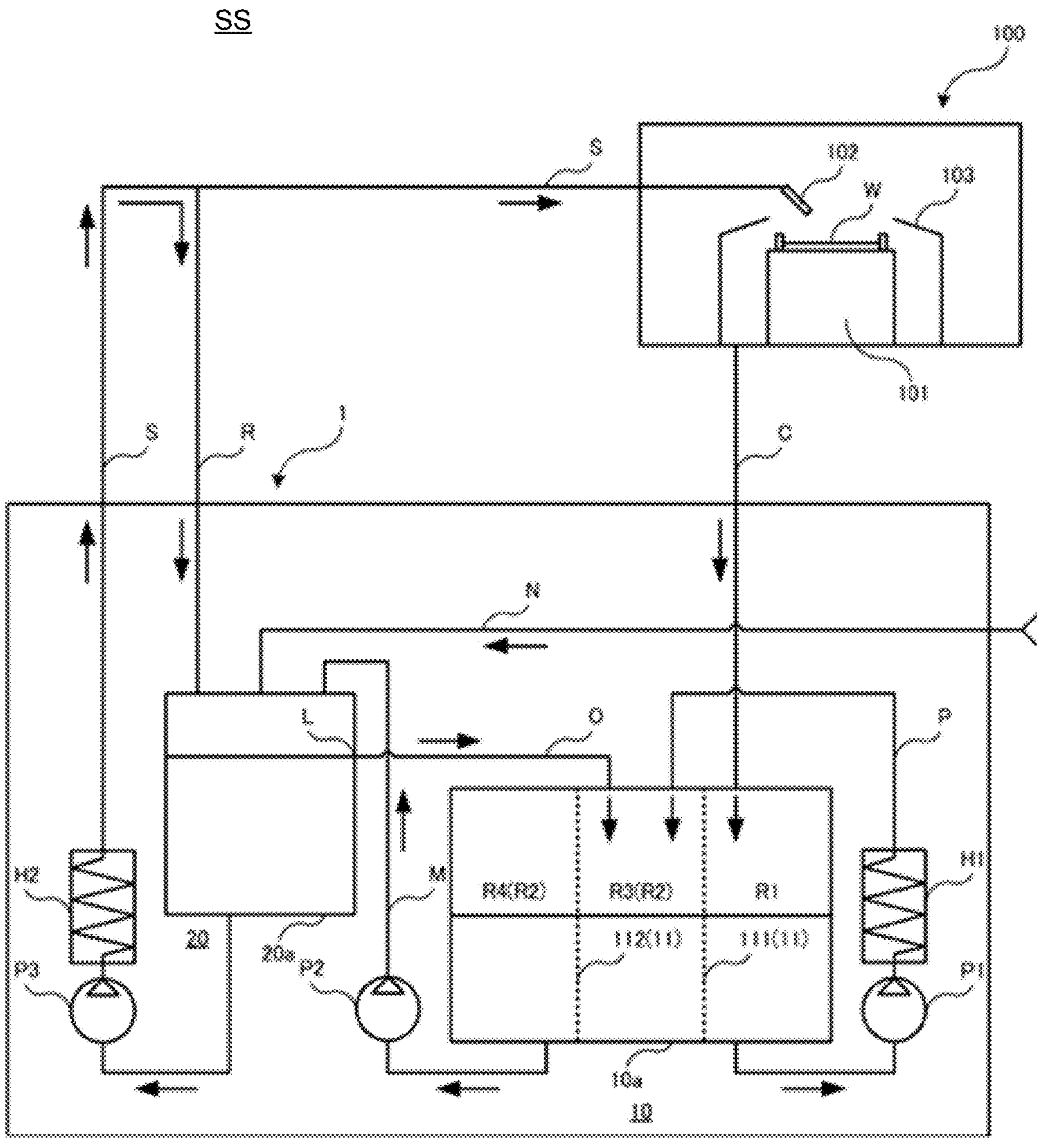
FIG. 1 is a diagram illustrating a substrate processing device and a supply device both according to an embodiment.

Embodiments of the present disclosure will be described below with reference to the accompanying figures. As illustrated in FIG. 1, a supply device 1 according to this embodiment collects a process liquid from a substrate processing device 100, and supplies the process liquid to the substrate processing device 100. Moreover, although it is not illustrated in FIG. 1, the plurality of substrate processing devices 100 is provided for the single supply device 1. A system that circulates the process liquid by such supply device 1 and by such substrate processing devices 100 will be defined as a supply system SS.

(Substrate Processing Device)

The substrate processing device 100 is a single-wafer-type substrate processing device that supplies the process liquid to a substrate W, such as a semiconductor wafer or a glass, to execute etching. The substrate processing device 100 includes a rotary driving unit 101 that holds and rotates the substrate W, a process liquid supplying unit 102 that supplies the process liquid to the substrate W, and a process liquid collecting unit 103 that collects the process liquid which is supplied to the substrate W.

The rotary driving unit 101 is a spin chuck which holds the edge of the substrate W by, for example, chuck pin, and which rotates the holding substrate W around an axis that intersects perpendicularly to the substrate W. The process liquid supplying unit 102 is a nozzle which is provided above, for example, the rotary driving unit 101, and which discharges the process liquid toward a surface of the substrate W that is being rotated by the rotary driving unit 101. The other end of the nozzle is connected to the supply device 1 through piping S to be described later. Note that a single process liquid supplying unit 102 may be provided for the surface of the substrate W, or the plurality of such units may be provided. The process liquid is an acid-based liquid, such as fluoric acid, phosphoric acid, or sulfuric acid. The process liquid collecting unit 103 is a casing which is provided so as to surround, for example, the rotary driving unit 101, and which collects the process liquid overflown from the surface of the substrate W through a bottom portion. That is, the bottom portion of the process liquid collecting unit 103 is provided with an opening, and this opening is connected to the supply device 1 through piping C to be described below.

(Supply Device)

The supply device 1 heats the process liquid collected from the substrate processing devices 100 after etching, and supplies such a liquid again to the substrate processing devices 100. The supply device 1 includes the piping C that is collect piping which collects the process liquid from the process liquid collecting unit 103 of each substrate processing device 100 after etching, a collect tank 10 which is connected to the piping C and which stores the process liquid collected through the piping C, a supply tank 20 which is connected to the collect tank 10, and which stores the process liquid heated in the collect tank 10, and piping S that is supply piping which is connected to the supply tank 20 and which supplies the process liquid to the process liquid supplying unit 102 of each substrate processing device 100 from the supply tank 20.

Figure 2:
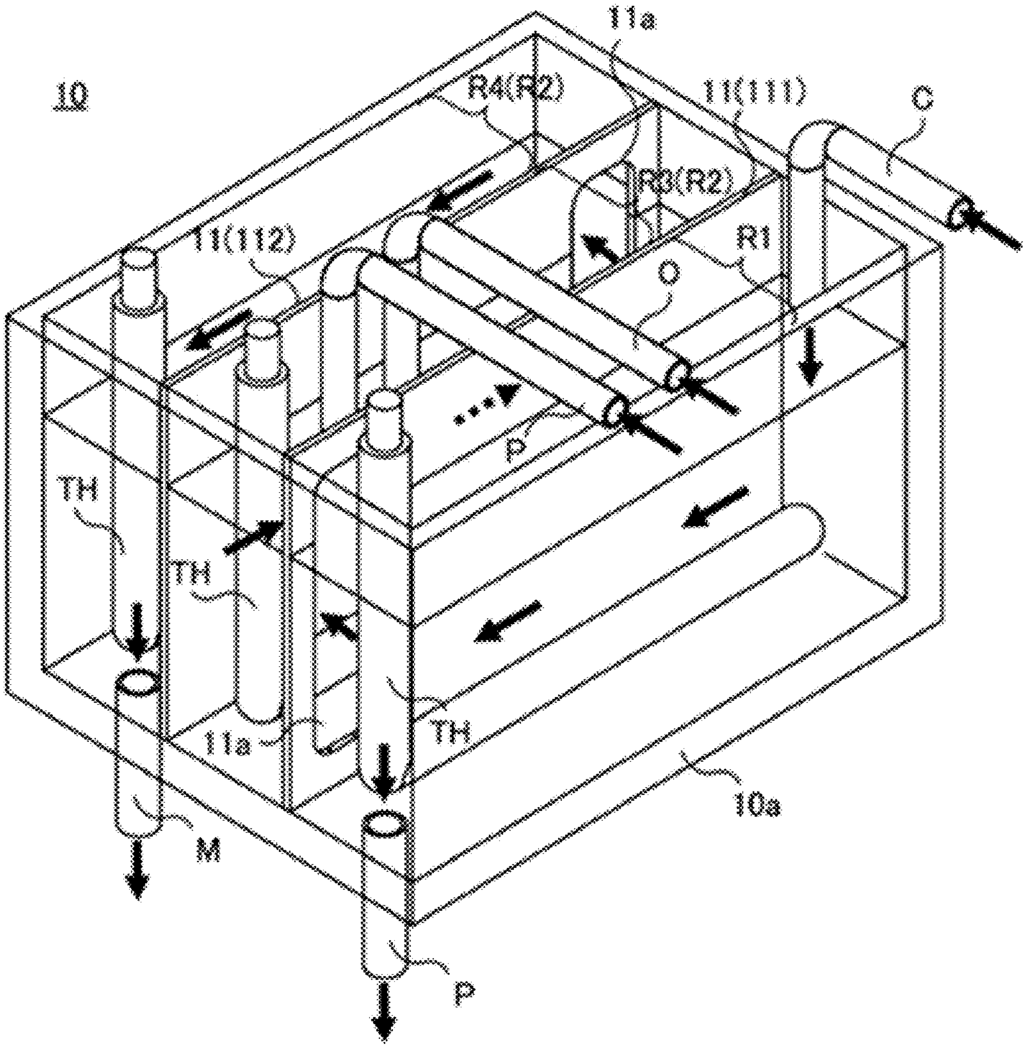
FIG. 2 is a transparent perspective view illustrating a collect tank according to the embodiment.

The collect tank 10 includes a container 10*a* in a rectangular shape to store the process liquid. The container 10*a* is formed of a material that has a corrosion resistance to the process liquid. As illustrated in FIG. 2, the container 10*a* is divided into a plurality of regions by dividing plates 11. In FIG. 2, the three regions are divided by the two dividing plates 11. The container 10*a* is initially divided into a first region R1 in which the process liquid is introduced from the piping C, and a second region R2 connected to the supply tank 20. Moreover, the second region R2 is divided into a third region R3 which adjoins to the first region R1 and in which the process liquid is introduced from the first region R1, and a fourth region R4 which adjoins to the third region R3, is connected to the supply tank 20, and supplies the process liquid to each substrate processing device 100. Note that when the two dividing plates 11 are distinguished from each other, the dividing plate 11 that divides the first region R1 and the second region R2 will be defined as a first dividing plate 111, and the dividing plate 11 that divides the third region R3 of the second region R2 and the fourth region R4 will be defined as a second dividing plate 112. Moreover, an in-tank heater TH that maintains the temperature of the process liquid is provided in each region R1, R3 and R4.

Respective openings 11*a* in an elongated circular shape with the same size are formed in the first dividing plate 111 and in the second dividing plate 112, causing the regions R1 and R3, and, R3 and R4 to be in communication with each other. Since the process liquid flows through the openings 11*a* across the regions R1, R3 and R4, the liquid level of the process liquid becomes equal across the regions R1 and R3 and R4. Even if the amount of the process liquid in the container 10*a* is little, in order to allow the process liquid to flow across the regions R1, R3 and R4, the openings 11*a* according to this embodiment are each elongated in the direction along the liquid level. Moreover, it is preferable that the size of the opening 11*a* should be a size that does not prevent the process liquid from flowing in the fourth region R4 due to a circumstance that the process liquid introduced in the third region R3 of the second region R2 from piping P to be described later attempts to return to the first region R1 again through such opening 11*a*, and thus the process liquid circulates within the regions R1 and R3. Furthermore, the dividing plate 11 is formed of a material that has thermal insulation properties in addition to the corrosion resistance, and suppresses the reduction of the temperature difference of the process liquid across the regions R1, R3 and R4. Moreover, the respective positions in which the respective openings 11*a* of this embodiment are formed are apart from each other between the dividing plates 11 in view of preventing the temperature of the process liquid from becoming equal across the regions R1, R3 and R4. For example, as illustrated in FIG. 2, when the opening 11*a* of the first dividing plate 111 is formed at the one side-surface side of the container 10*a* to which the end of the first dividing plate 111 is connected, it is preferable that the opening 11*a* of the second dividing plate 112 should be provided at the other side-surface side of the container 10*a* which is the opposite side to the one side surface.

The piping C is connected to the first region R1, and the process liquid is introduced from such piping. As illustrated in FIG. 2, in the container 10*a*, the piping C is provided at the other side-surface side which is the opposite side to the one side surface of the container 10*a* in which the opening 11*a* of the first dividing plate 111 is provided. Accordingly, the process liquid introduced from the piping C is prevented from immediately flowing in the region R3 through the opening 11*a* of the first dividing plate 111. The piping C introduces the process liquid collected from each substrate processing device 100 after etching.

Furthermore, piping P is connected to the bottom of the first region R1. More specifically, as illustrated in FIG. 2, the inlet opening of the piping P is provided near the opening 11*a* of the first dividing plate 111. The piping P feeds the process liquid to the region R3 of the second region R2 from the bottom of the first region R1. That is, a pump P1 is provided on the path through the piping P. Moreover, a heater H1 is provided on the path through the above-described piping P, e.g., the downstream side relative to the pump P1, and the process liquid fed out from the pump P1 is heated to an aiming predetermined temperature. An example predetermined temperature is 160° C. An unillustrated temperature sensor is provided at the downstream side relative to the heater H1, and upon receiving the feedback from the temperature sensor, the output by the heater H1 is adjusted. An example temperature sensor is a thermistor. As described above, in the first region R1, the process liquid introduced from the piping C is suctioned by the pump P1 from the piping P, is heated and fed to the region R3 of the second region R2. Since the process liquid introduced from the piping C has a lower liquid temperature than that of the whole process liquid in the container 10*a*, such a liquid moves to the bottom of the container 10*a*. Hence, the process liquid introduced from the piping C is preferentially suctioned in comparison with the whole process liquid in the container 10*a*. Note that the process liquid introduced from the piping C is not only suctioned from the piping P but also flows in the second region R2 through the opening 11*a*.

The piping P is connected to the third region R3 of the second region R2. More specifically, as illustrated in FIG. 2, the outlet opening of the piping P is provided near the opening 11*a* of the first dividing plate 111. The process liquid is introduced from the first region R1 through the piping P. Moreover, piping O is connected to the third region R3 of the second region R2. More specifically, as illustrated in FIG. 2, the outlet opening of the piping O is provided near the opening 11*a* of the first dividing plate 111. The process liquid is introduced from the supply tank 20 to be described later through the piping O. When the process liquid does not flow in from the piping C, this process liquid mainly flows in the first region R1 through the opening 11*a* of the first dividing plate 111. Moreover, the process liquid introduced in the third region R3 can also flow in the fourth region R4 through the opening 11*a* of the second dividing plate 112.

Piping M is connected to the bottom of the fourth region R4 of the second region R2, and the process liquid is supplied to the supply tank 20 through the piping M. The piping M is feed piping which suctions the process liquid from the bottom of the fourth region R4, and which feeds the suctioned liquid to the supply tank 20. That is, a pump P2 is provided on the path through the piping M.

The supply tank 20 includes a rectangular container 20*a* that stores the process liquid introduced from the collect tank 10. The container 20*a* is formed of a material that has a corrosion resistance to the process liquid. Through the piping O, the piping S is connected to the bottom of the supply tank 20, and through the piping S, the process liquid is supplied to the process liquid supplying unit 102 of each substrate processing device 100. The piping S suctions the process liquid from the bottom of the supply tank 20. That is, a pump P3 is provided on the path through the piping S. Moreover, a heater H2 is provided on the path through the piping S, e.g., the downstream side relative to the pump P3, and the process liquid fed from the pump P3 is heated to an aiming predetermined temperature. An example predetermined temperature is 160° C. A temperature sensor is provided at the downstream side relative to the heater H2, and upon receiving the feedback from the temperature sensor, the output by the heater H2 is adjusted. An example temperature sensor is a thermistor. Hence, the process liquid heated to the predetermined temperature is supplied to the process liquid supplying unit 102 of each substrate processing device 100. Note that a filter that eliminates impurities from the process liquid may be provided on the path through the piping S.

Moreover, the piping O that is overflow piping is connected to the upper portion of the side surface of the supply tank 20, and through the piping O, the process liquid is introduced in the collect tank 10. Note that since the piping O according to this embodiment is not provided with a pump, as illustrated in FIG. 1, the position at which the piping O is provided in the supply tank 20 is located higher than the height of the liquid level of the process liquid in the collect tank 10. More specifically, as described above, the process liquid is introduced in the region R3 of the second region R2 of the collect tank 10. That is, when the liquid level of the process liquid in the supply tank 20 increases to a connection position L to the piping O, the process liquid overflows from the supply tank 20 through the piping O, and flows out to the collect tank 10.

Furthermore, piping N and piping R are connected to the supply tank 20. The piping N is new-process-liquid piping which is connected to an unillustrated process liquid supply device including, for example, a process liquid feeding device and a valve, and which newly introduces the process liquid by what corresponds to the reduced amount due to etching, etc., at the substrate processing device 100. Note that in the process liquid supplying device, the process liquid is heated to the predetermined temperature, e.g., 160° C. in advance. Moreover, the decrease of the process liquid may be detected by an unillustrated level sensor provided in the supply tank 20. Note that the piping N is provided with an unillustrated valve, and can be opened or closed in conjunction with a level sensor. The piping R is return piping which is branched from the piping S, and which has a role of returning some of the supplied process liquid to the supply tank 20. Note that the piping S and the piping R are each provided with an unillustrated valve, etc., and the flow of the process liquid can be controlled by opening or closing these valves.

(Action)

Operations of the supply device 1 that employs the above-described structure will be described. As an example, in the substrate processing device 100, the process liquid supplying unit 102 discharges the process liquid to the substrate W, and the process liquid after etching is collected from the opening of the process liquid collecting unit 103 to the piping C. The process liquid collected to the piping C is introduced in the collect tank 10 of the supply device 1. More specifically, such a liquid is introduced in the first region R1 of the collect tank 10. Some of the process liquid introduced in the first region R1 flows in the adjacent second region R2 through the opening 11*a* of the first dividing plate 111. In contrast, the process liquid introduced in the first region R1 is mainly suctioned through the piping P connected to the bottom of the first region R1 by the pump P1. The suctioned process liquid is heated to the aiming predetermined temperature by the heater H1 provided at the downstream side relative to the pump P1.

The process liquid heated by the heater H1 is fed to the third region R3 of the second region R2 through the piping P by the pump P1. The process liquid fed to the third region R3 flows in the first region R1 and in the fourth region R4 of the second region R2 through the opening 11*a* of the dividing plate 11.

The process liquid that flows in the fourth region R4 from the third region R3 is suctioned to the piping M connected to the bottom of the fourth region R4 by the pump P2. The suctioned process liquid is fed to the supply tank 20. The process liquid introduced in the supply tank 20 is suctioned to the piping S connected to the bottom by the pump P3. The suctioned process liquid is heated to the aiming predetermined temperature by the heater H2 provided at the downstream side relative to the pump P2. The process liquid heated by the heater H2 is supplied to the process liquid supplying unit 102 of each substrate processing device 100. Accordingly, since the process liquid supplying unit 102 can discharge the process liquid heated to the predetermined temperature, etching at a desired etching rate can be executed on the substrate W. Moreover, when the liquid level of the process liquid introduced in the supply tank 20 increases to the connection position to the piping O, such a liquid overflows from the supply tank 20 through the piping O, and flows out to the collect tank 10. Note that the process liquid introduced in the collect tank 10 through the piping O is mixed with, in the second region R2, the heated process liquid supplied from the piping P, thus having a temperature becoming close to the aiming temperature.

Advantageous Effects (1) The supply device 1 according to this embodiment includes a collect tank 10 which collects the process liquid from the substrate processing device 100 and which heats the collected liquid, and the supply tank 20 which is connected to the collect tank 10 and which supplies, to the substrate processing device 100, the process liquid heated in the collect tank 10. The collect tank 10 includes the container 10*a* that stores the process liquid, the first dividing plate 111 that divides the container 10*a* into the first region R1 where the process liquid is introduced from the substrate processing device 100, and the second region R2 that introduces the process liquid to the supply tank 20, the piping P that feeds, to the second region R2, the process liquid introduced in the first region R1, the heater H1 which is provided on the path through the piping P and which heats the process liquid, and the piping M that feeds, to the supply tank 20, the process liquid in the second region R2 and heated by the heater H1. The supply tank 20 includes the container 20*a* that stores the process liquid fed out from the collect tank 10, the piping S that supplies, to the substrate processing device 100, the process liquid stored in the container 20*a*, and the heater H2 which is provided on the path through the piping S and which heats the process liquid.

As described above, in the collect tank 10 according to this embodiment, the process liquid heated by the heater H1 is stored in the second region R2 different from the first region R1 where the process liquid is introduced in the collect tank 10, and the process liquid is supplied from the second region R2 to the supply tank 20. That is, since the heat from the process liquid in the first region R1 is insulated by the first dividing plate 111, the liquid temperature of the process liquid in the second region R2 and to be supplied to the supply tank 20 can be stabilized. Moreover, since the heated process liquid is fed to the supply tank 20 in sequence which is heat-insulated from the collect tank 10, the adverse effect of the change in the liquid temperature by the process liquid collected by the piping C can be reduced. As described above, since the liquid temperature of the process liquid fed to the supply tank 20 can be stabilized, it is unnecessary to largely change the output by the heater H2 that heats the process liquid immediately before such a liquid is supplied to the substrate processing device 100, a control that makes such an output substantially constant is simply executed, and thus the control is facilitated. Moreover, since the process liquid in the second region R2 is once heated by the heater H1, in comparison with the process liquid in the first region R1, the liquid temperature has become high. Accordingly, the heater H2 can heat the process liquid to the predetermined temperature with a relatively small output.

According to conventional technologies, since a supply tank is not provided with a dividing plate, the liquid temperature within the supply tank always changes due to the process liquid collected irregularly and at a variable amount. It is difficult to control the output of a heater that heats the process liquid so as to be a desired temperature with respect to such a changing liquid temperature. For example, the amount of the process liquid to be collected temporarily increases when the processes in the respective substrate processing devices overlap. In such a case, although the liquid temperature within the supply tank remarkably decreases, even if the output of the heater is increased in accordance with such a temperature decrease, when the amount of the process liquid to be collected later decreases, it is necessary to immediately suppress the output of the heater. In contrast, according to the collect tank 10 of this embodiment, since the process liquid in the second region R2 divided by the first dividing plate 111 is not likely to be affected by the temperature of the process liquid that is introduced irregularly and at a variable amount, and the heated process liquid is fed to the supply tank 20 in sequence which is a different component from the collect tank 10, the change in the liquid temperature of the process liquid can be suppressed. Accordingly, the change in the output of the heater H2 that heats the process liquid in the supply tank 20 can be suppressed, and thus a stable control is enabled.

(2) The first dividing plate 111 according to this embodiment is provided with the opening 11*a* which causes the first region R1 and the second region R2 to be in communication with each other, and through which the process liquid flows.

Accordingly, since some of the process liquid in the second region R2 flows in the first region R1 through the opening 11*a*, even if, for example, the collected process liquid does not flow in the first region R1, the flow rate of the process liquid fed by the pump P1 can be maintained. If the opening 11*a* is not formed in the first dividing plate 111, since the flow rate of the process liquid fed to the heater H1 from the pump P1 changes because the amount of the process liquid introduced in the first region R1 changes, it becomes difficult to control the output of the heater H1. In contrast, since the opening 11*a* formed in the first dividing plate 111 of this embodiment can maintain the flow rate of the process liquid fed to the heater H1 from the pump P1 or can suppress the change in the flow rate, the output control for the heater H1 is stabilized.

Furthermore, when the plurality of substrate processing device 100 is connected to the collect tank 10, depending on the substrate processing timing at each substrate processing device 100, the amount of the process liquid introduced in the first region R1 remarkably decreases. In this case, although the process liquid flows in the first region R1 from the second region R2 through the opening 11*a* of the first dividing plate 111, the process liquid in the second region R2 is once heated by the heater H1, thus having a high liquid temperature. Accordingly, since the liquid temperature of the process liquid suctioned from the first region R1 by the piping P is also high, the heater H1 can heat the process liquid to the predetermined temperature with relatively small output.

(3) The collect tank 10 according to this embodiment further includes the second dividing plate 112 that divides the second region R2 into the third region R3 where the process liquid is fed from the piping P, and the fourth region R4 that supplies the process liquid to the supply tank 20, and the second dividing plate 112 is provided with the opening 11*a* which causes the third region R3 and the fourth region R4 to be in communication with each other, and through which the process liquid flows. Accordingly, since the two dividing plates 11 are provided between the first region R1 where the collected process liquid is introduced and the fourth region R4 of the second region R2 that feeds the process liquid, the liquid temperature change with respect to the process liquid to be fed to the supply tank 20 can be further effectively suppressed.

(4) The opening 11*a* of the first dividing plate 111 according to this embodiment is formed at the one side-surface side of the container 10*a* of the collect tank 10 to which the end of the first dividing plate 111 is connected, and the opening 11*a* of the second dividing plate 112 is formed at the other side-surface side of the container 10*a* of the collect tank 10 which is the opposite side to the one side surface thereof. By arranging the respective openings 11*a* of the two dividing plates 11 alternately in the manner as described above, the process liquid is not likely to flow in, from the first region R1 where the process liquid is collected, the fourth region R4 of the second region R2 that supplies the process liquid, and thus the liquid temperature change can be further effectively suppressed.

(5) The supply device 1 according to this embodiment includes the piping R which is branched from the piping S and which introduces the process liquid in the container 20*a* of the supply tank 20. According to conventional technologies, when, for example, the process in the substrate processing device 100 is delayed, there is a possibility such that the liquid temperature of the process liquid decreases within the piping S. According to the supply device 1 of this embodiment, by causing the process liquid to circulate by the piping R, the process liquid just heated by the heater H2 can be always supplied, and thus the possibility such that the process liquid that has the decreased liquid temperature is supplied to the substrate processing device 100 can be reduced.

Note that after the substrate processing in the substrate processing device 100 ends, the process liquid is no longer introduced from the piping C, and the process liquid in the supply tank 20 is circulated through the piping S and through the piping R. In this case, since it is sufficient for the heater H2 to compensate only the heat quantity by what corresponds to the dissipated heat through the piping S and through the piping R, the process liquid can be heated to the predetermined temperature with relatively small output.

(6) The supply device 1 according to this embodiment further includes the piping O which is connected to the upper portion of the side surface of the supply tank 20 and which introduces the process liquid in the container 10*a* of the collect tank 10 when the liquid level of the process liquid in the supply tank 20 reaches the connection position. Accordingly, since the constant flow rate of the process liquid fed to the pump P3 can be maintained, the heating control of the heater H2 can be further stabilized. Moreover, the process liquid introduced in the collect tank 10 by the piping O can be heated again by the heater H2. Furthermore, the process liquid introduced in the collect tank 10 by the piping O is once heated by the heater H1, thus having a relatively high temperature. That is, since this process liquid has the stable liquid temperature like the process liquid in the supply tank 20, it can be immediately supplied to the supply tank 20 without re-heating. Hence, the sufficient amount of the process liquid to be supplied to the substrate processing device 100 can be ensured.

(7) The piping P and the piping O according to this embodiment are provided near the opening 11*a* of the first dividing plate 111 in the second region R2. Accordingly, the process liquid with the low liquid temperature in the first region R1 is suppressed to flow in the second region R2. Moreover, by setting the flow rate suctioned through the piping P to be larger than the flow-in amount from the piping C, the process liquid flows in the first region R1 from the second region R2, and thus a rate that the liquid temperature of the process liquid in the first region R1 is decreased by the process liquid after etching can be decelerated. Hence, since the output change of the heater H1 can be suppressed, the control on the heater H1 is facilitated. Furthermore, since the process liquid that flows in the first region R1 from the second region R2 is heated again by the heater H1, the liquid temperature of the second region R2 can be further stabilized.

(8) The supply device 1 according to this embodiment further includes the piping N which is connected to the supply tank 20 and which supplies the pre-heated process liquid. Accordingly, in comparison with a case in which the piping N is connected to the collect tank 10, since the liquid temperature of the process liquid in the supply tank 20 is stabilized, the heating control by the heater H2 for the process liquid is facilitated. Moreover, even if the amount of the process liquid introduced from the piping C in the collect tank 10 is little, and thus the pump P2 cannot feed the sufficient process liquid, since the process liquid is introduced from the piping N, the amount of the process liquid in the supply tank 20 is secured. Note that when the excessive process liquid is supplied to the supply tank 20, the process liquid returns to the collect tank 10 through the above-described piping O, an event in which the amount of the process liquid in the supply tank 20 becomes excessive is avoided. As described above, by the piping N, the liquid temperature and amount of the process liquid in the supply tank 20 can be stabilized.

(9) The supply system SS according to this embodiment includes the above-described supply device 1, the substrate processing device 100 that processes the substrate W by the process liquid, and the piping C which collects, from the substrate processing device 100, the process liquid after the substrate W is processed, and which introduces the collected liquid in the first region R1 of the container 10*a* of the collect tank 10, and the piping C is provided, in the container 10*a*, at the other side-surface side which is the opposite side to the one side surface of the container 10*a* where the opening 11*a* of the first dividing plate 111 is located. Accordingly, the process liquid which is introduced after etching from the piping C and which has the decreased liquid temperature is prevented from immediately flowing in the region R3 through the opening 11*a* of the first dividing plate 111, and from decreasing the liquid temperature of the process liquid in the region R3.

MODIFIED EXAMPLES

This embodiment is not limited to the above-described form, and the following modified examples can be employed. For example, although the piping P, the piping M and the piping S are provided with the pump P1, the pump P2 and the pump 3, respectively, the piping C, the piping N, the piping O and the piping R may be provided with pumps, respectively. In particular, by causing the piping O to be provided with the pump, the degree of freedom for tank layout increases such that the height at which the piping O is provided to the supply tank 20 can be lower than the liquid level at the collect tank 10.

Figure 3:
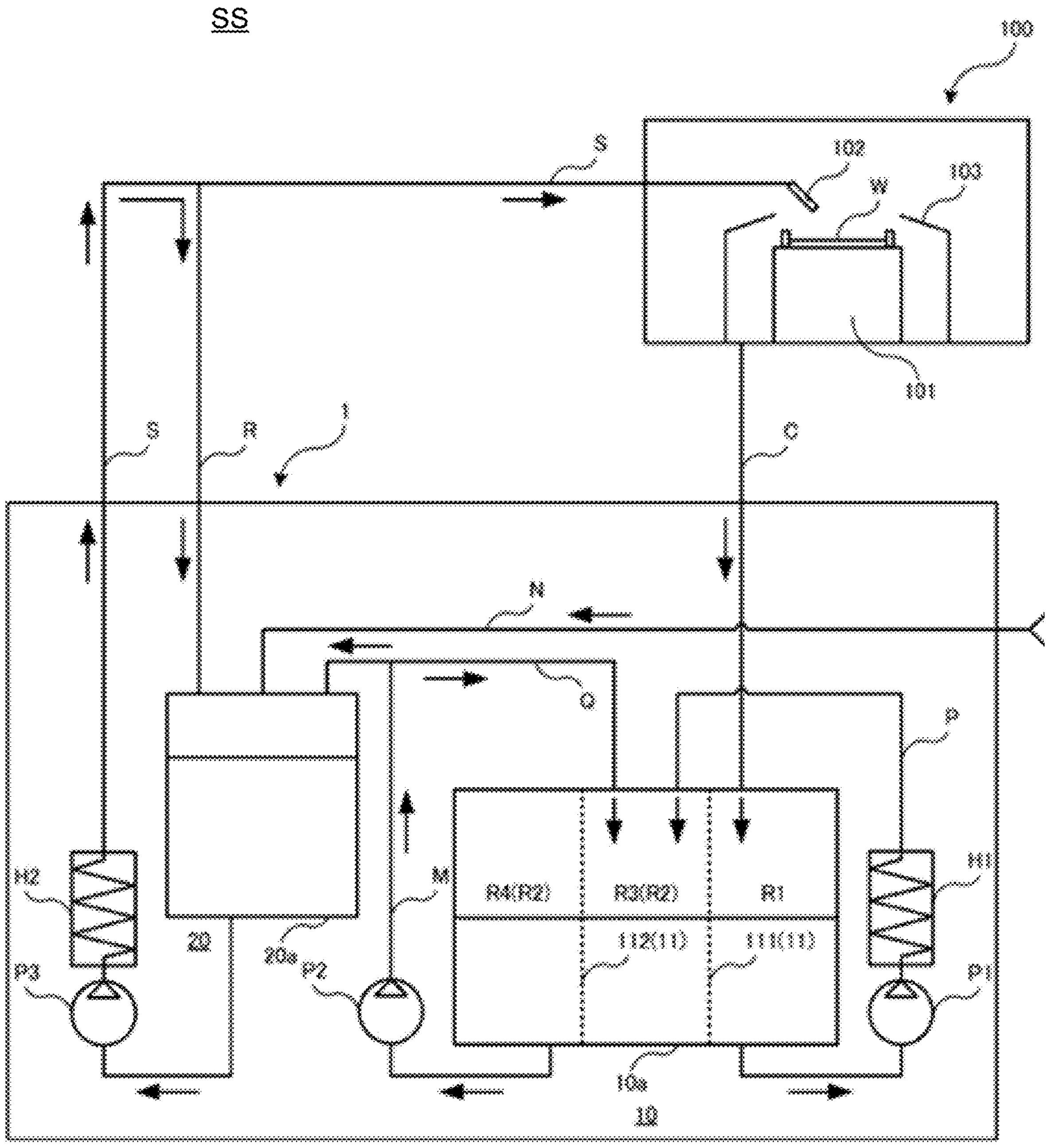
FIG. 3 is a diagram illustrating a substrate processing device and a supply device both according to a modified example of the embodiment.

The piping O may be eliminated. When the piping O is eliminated, the liquid level at the supply tank 20 may be made constant by controlling the pump P2. Alternatively, as illustrated in FIG. 3, piping Q that is branched piping from the piping M may be provided at the tip of the pump P2, and some of the process liquid may be returned to the collect tank 10 through the piping Q so as to make the liquid level at the supply tank 20 constant. Note that a three-way valve may be provided at a portion where the piping Q is branched from the piping M, the liquid level of the process liquid in the supply tank 20 may be detected by an unillustrated level sensor, and the flow of the process liquid may be changed by the three-way valve.

Moreover, in the above-described embodiment, although the number of the dividing plates 11 is two, such a number is not limited to this example. It may be one plate or equal to or greater than three plates. What is necessary is a structure in which at least the region where the collected process liquid is introduced and the region that supplies the heated process liquid are divided. Furthermore, the site in which the opening 11*a* is formed is not limited to the particular site, and for example, it may be formed in the center portion of the dividing plate 11. Note that the opening 11*a* is not limited to an elongated circular opening, it may be a slit, and a plurality of circular openings may be arranged side by side. Still further, communication piping to make the liquid level at the first region R1 and at the liquid level at the second region R2 constant may be provided as a substitute for the function of the opening 11*a*.

Moreover, in the above-described embodiment, although the third region R3 of the second region R2 and the fourth region R4 are caused to be in communication with each other through the opening 11*a*, like a structure between the first region R1 and the second region R2, such regions may be caused to be in communication with each other by piping, and the process liquid may be fed to the fourth region R4 from the third region R3 by a pump provided on the path through such piping. Alternatively, without forming the opening 11*a* in the second dividing plate 112, by allowing the liquid level at the fourth region R4 to reach the upper end of the second dividing plate 112, the process liquid in the fourth region R4 may be allowed to flow in the third region R3.

OTHER EMBODIMENTS

The embodiment of the present disclosure and the modified examples of the structural components have been described above, but the embodiment and the modified examples of the structural components are merely presented as examples, and are not intended to limit the scope and spirit of the present disclosure. The above-described novel embodiment, etc., can be carried out in other various forms, and various omissions, replacements and modifications can be made thereto without departing from the scope and spirit of the present disclosure. Such embodiments and modified examples thereof fall within the scope and spirt of the present disclosure, and also fall within the scope and spirit of the invention as recited in claims.

What is claimed is:

1. A supply device comprising:

a collect tank which collects a process liquid from a substrate processing device, the collect tank heats the collected liquid; and a supply tank which is connected to the collect tank, which supply tank supplies, to the substrate processing device, the process liquid heated in the collect tank, wherein:

the collect tank comprises:

a collect container that stores the process liquid;

a first dividing plate that divides the collect container into a first region where the process liquid is introduced from the substrate processing device, and a second region that introduces the process liquid to the supply tank;

piping that feeds, from the first region to the second region, the process liquid introduced in the first region;

a first heater which is provided the piping and which heats the process liquid;

feed piping that feeds, from the second region to the supply tank, the process liquid in the second region and heated by the first heater, and a second dividing plate that divides the second region into a third region where the process liquid is fed from the first region through the piping, and a fourth region that supplies the process liquid to the supply tank through the feed piping, wherein the first dividing plate is provided at one side-surface side of the collect container of the collect tank at which an end of the first dividing plate is connected, and is provided with an opening which causes the first region and the second region to be in communication with each other; and the second dividing plate is provided at an other side-surface side that is an opposite side to the one side surface of the collect container of the collect tank, and is provided with an opening which causes the third region and the fourth region to be in communication with each other, and the supply tank comprises:

a supply container that stores the process liquid fed out from the collect tank;

supply piping that supplies, from the supply container to the substrate processing device, the process liquid stored in the supply container; and a second heater which is provided the supply piping and which heats the process liquid.

2. The supply device according to claim 1, further comprising return piping which is provided so as to be branched from the supply piping, which return piping introduces the process liquid to the supply container of the supply tank.

3. A supply system comprising:

the supply device according to claim 2;

a substrate processing device that processes a substrate by the process liquid; and collect piping which collects, from the substrate processing device, the process liquid after the substrate is processed, said collect piping introducing the collected liquid from the substrate processing device into the first region of the collect tank.

4. The supply device according to claim 1, further comprising overflow piping which is connected to an upper portion of the side surface of the supply tank, which overflow piping introduces the process liquid from the control tank into collect container of the collect tank when a liquid level of the process liquid in the supply tank reaches a connection position.

5. The supply device according to claim 4, wherein the piping and the overflow piping are provided near the opening of the first dividing plate in the second region.

6. A supply system comprising:

the supply device according to claim 4;

a substrate processing device that processes a substrate by the process liquid; and collect piping which collects, from the substrate processing device, the process liquid after the substrate is processed, said collect piping introducing the collected liquid from the substrate processing device into the first region of the collect tank.

7. A supply system comprising:

the supply device according to claim 5;

a substrate processing device that processes a substrate by the process liquid; and collect piping which collects, from the substrate processing device, the process liquid after the substrate is processed, said collect piping introducing the collected liquid from the substrate processing device into the first region of the collect tank.

8. The supply device according to claim 1, further comprising new-process-liquid piping which is connected to the supply tank, which new-process-liquid piping supplies the pre-heated process liquid to the supply tank.

9. A supply system comprising:

the supply device according to claim 8;

a substrate processing device that processes a substrate by the process liquid; and collect piping which collects, from the substrate processing device, the process liquid after the substrate is processed, said collect piping introducing the collected liquid from the substrate processing device into the first region of the collect tank.

10. A supply system comprising:

the supply device according to any one of claim 1;

a substrate processing device that processes a substrate by the process liquid; and collect piping which collects, from the substrate processing device, the process liquid after the substrate is processed, which collect piping introduces the collected liquid from the substrate processing device into the first region of the collect tank.

11. The supply system according to claim 10, wherein the collect piping is provided, in the collect container of the collect tank, at the other side-surface side which is an opposite side to the one side surface of the collect container where the opening of the first dividing plate is provided.

* * * * *